Oct. 26, 1948. B. S. HUGHES 2,452,465
CENTRIFUGAL SEPARATOR
Filed March 21, 1946

Inventor,
Burton S. Hughes,
by Walter P. Geyer
Attorney.

Patented Oct. 26, 1948

2,452,465

UNITED STATES PATENT OFFICE 2,452,465

CENTRIFUGAL SEPARATOR

Burton S. Hughes, Buffalo, N. Y., assignor to Zaremba Company, Buffalo, N. Y., a corporation of Maine Application March 21, 1946, Serial No. 656,001

1 Claim. (Cl. 183—79)

This invention relates to certain new and useful improvements in the centrifugal separators employed in connection with condensers, evaporators and like apparatus.

It has for one of its objects to provide a separator of this character which is so designed as to avoid re-entrainment of the liquor thrown out by centrifugal force and thereby materially enhance the efficiency of the separator.

Another object of the invention is to provide a centrifugal separator having a simple and effective drain valve structure which is so constructed as to prevent vapor passing up into the separator but which permits liquor to flow or drain out.

A further object is to provide the drain opening of the separator with a protective box or shield which functions to effectually prevent the high velocity vapor flow from interfering with the entrance of the liquor to the drain.

Other features of the invention reside in the construction and arrangement of parts hereinafter described and particularly pointed out in the appended claim.

Figure 1:
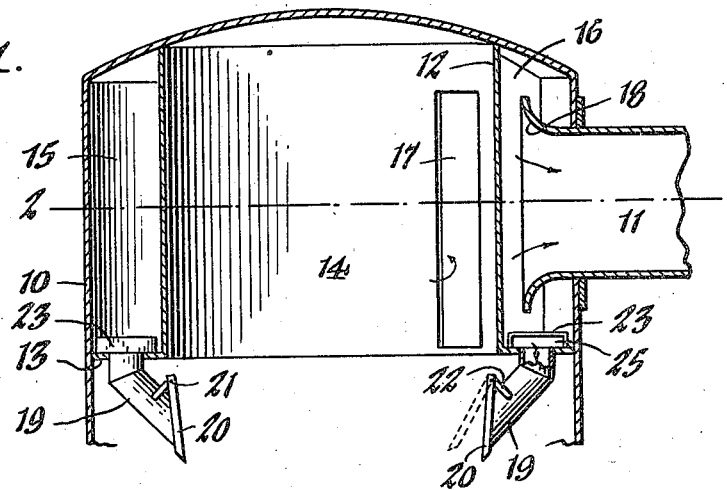
Figure 2:
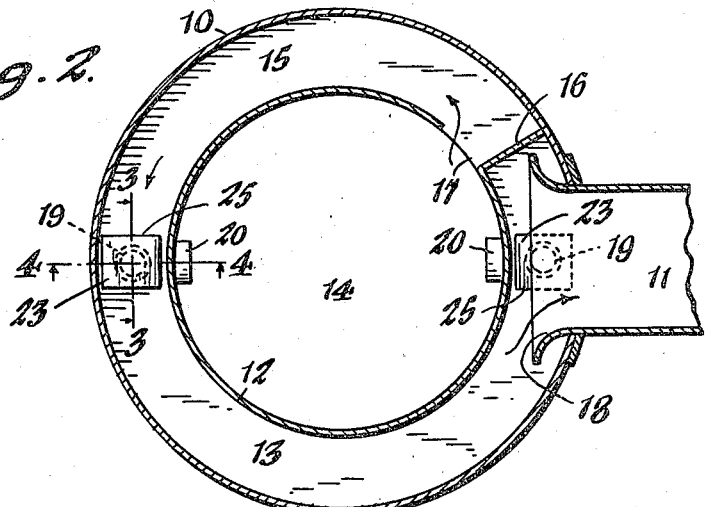
Figure 3:
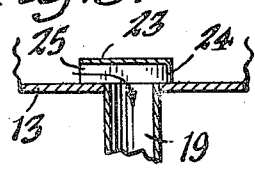
Figure 4:
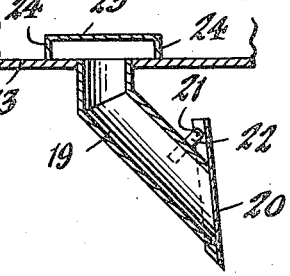

In the accompanying drawings:

Figure 1 is a vertical section of a centrifugal separator embodying my improvements. Figure 2 is a horizontal section thereof taken on line 2—2, Figure 1. Figures 3 and 4 are enlarged fragmentary, vertical section taken in the correspondingly numbered lines in Figure 2.

Similar characters of reference indicate corresponding parts throughout the several views.

By way of example, my invention has been shown in connection with a centrifugal separator of usual construction, 10 indicating the cylindrical body thereof which may constitute the top of the evaporator in connection with which it is used and which is provided in one side thereof and adjacent its upper end with a vapor discharge pipe 11. Disposed concentrically within this body in spaced relation thereto is a substantially circular well or partition 12 which extends at its upper end to the head of the separator body while its lower end terminates in an outwardly-extending annular flange 13 secured to the side of such body. The resulting inner chamber 14 formed by this partition communicates with the evaporator while the outer or separating chamber 15 thereof communicates with the vapor discharge pipe, the partition terminating at one side of the latter in a radially-disposed, upright flange or closure wall 16 and having a port 17 therein adjoining such flange for the passage of the vapor into the separating chamber, whereby the fluid being treated flows circumferentially through such chamber, as indicated by the arrows in Figure 2.

The vapor discharge pipe 11 extends radially into the separating chamber 15 where it terminates in an outwardly-flared section or intake mouth 18 which functions to avoid re-entrainment of liquor thrown out by centrifugal force, and thereby effectually eliminates loss of liquor by preventing its being carried out with the current of vapor through the discharge pipe.

The partition flange 13 constitutes the bottom wall of the centrifugal chamber 15 and depending therefrom is a plurality of drain pipes 19 through which the liquor is adapted to flow by gravity toward the central portion of the separator and thence into the evaporator. Applied to the lower or discharge end of each drain pipe is a vertically-swinging valve 20, preferably in the form of a hinged flap or clapper, pivoted on a horizontal pintle 21 mounted on a bracket 22 secured to the top side of the drain pipe. The discharge end of the latter has its valve-engaging edge inclined to the vertical whereby the valve is normally retained by gravity in its closed position, but is free to open in response to the flow of liquor therethrough. While permitting the discharge of the liquor in this manner, the valve effectually prevents the passage of vapor upwardly into the separator.

Each of the openings in the partition-flange 13 leading to the drain pipes 19 is covered with a protective box or shield 23 of substantially rectangular shape in plan whose top wall is disposed in overhanging relation to the opening and is provided at three of its edges with depending flanges or side walls 24. The remaining side of the shield is open, as indicated at 25, and faces or opens toward the direction of flow of the liquor in the separating chamber 15. This protective shield serves to prevent the high velocity vapor flow from interfering with the entrance of liquor to the drain pipes.

While manifestly simple, compact and inexpensive in construction and easy to install, these improvements greatly enhance the efficiency of the separator by preventing re-entrainment of liquor thrown out by centrifugal force, by preventing vapor passing upwardly into the separator, and by preventing the high velocity vapor flow from interfering with the entrance of liquor to the drains.

I claim as my invention:

A separator of the character described, comprising a cylindrical body having a concentricallyshaped circular partition therein terminating at its lower end in an annular flange abutting said body and defining inner and outer communicating chambers with the outer chamber closed at its top and bottom and constituting a centrifugal separating chamber, said partition having a port therein for establishing communication between such chambers and a radial closure wall extending across the outer chamber at one side of said port, a vapor discharge pipe communicating with said separating chamber adjacent the opposite side of said radial closure wall and extending part way into the same and having an outwardly-flared intake mouth, a drain pipe leading from the bottom of the separating chamber and provided at its lower end with a vertically-swinging valve for permitting liquid to flow therefrom but preventing the flow of vapor into such chamber, and a box-like shield disposed over the mouth of said drain pipe and having an opening in that side thereof facing toward the direction of flow of the liquid through the separating chamber.

BURTON S. HUGHES.

REFERENCES CITED

The following references are of record in the file of this patent:

UNITED STATES PATENTS

| Number | Name | Date |
|---|---|---|
| 619,207 | Musnicki | Feb. 7, 1899 |
| 869,680 | Aitken et al. | Oct. 29, 1907 |
| 1,120,691 | Conklin | Dec. 15, 1914 |
| 1,720,536 | Young | July 9, 1929 |